US011106078B2

(12) United States Patent
Zhang et al.

(10) Patent No.: US 11,106,078 B2
(45) Date of Patent: Aug. 31, 2021

(54) DISPLAY PANEL AND DISPLAY DEVICE

(71) Applicant: Wuhan China Star Optoelectronics Technology Co., Ltd., Hubei (CN)

(72) Inventors: Zhou Zhang, Hubei (CN); Changwen Ma, Hubei (CN); Pan Xu, Hubei (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 0 days.

(21) Appl. No.: 16/623,374

(22) PCT Filed: Oct. 17, 2019

(86) PCT No.: PCT/CN2019/111701
§ 371 (c)(1),
(2) Date: Dec. 16, 2019

(87) PCT Pub. No.: WO2021/017194
PCT Pub. Date: Feb. 4, 2021

(65) Prior Publication Data
US 2021/0033918 A1 Feb. 4, 2021

(30) Foreign Application Priority Data
Jul. 30, 2019 (CN) .......................... 201910692549.4

(51) Int. Cl.
*G02F 1/1335* (2006.01)
*G02F 1/1333* (2006.01)
*G02F 1/1339* (2006.01)

(52) U.S. Cl.
CPC .... *G02F 1/133514* (2013.01); *G02F 1/13338* (2013.01); *G02F 1/13394* (2013.01); *G02F 1/133528* (2013.01); *G02F 2201/08* (2013.01); *G02F 2201/52* (2013.01); *G02F 2202/022* (2013.01)

(58) Field of Classification Search
CPC .......... G02F 1/13394; G02F 1/133514; G02F 1/13338; G02F 1/133528; G02F 1/133512
See application file for complete search history.

(56) References Cited

U.S. PATENT DOCUMENTS

2003/0156230 A1* 8/2003 Boer .................... G06K 9/0004
349/42
2007/0211196 A1* 9/2007 Kang .................. G02F 1/13394
349/106

(Continued)

FOREIGN PATENT DOCUMENTS

CN 105678255 A 6/2016
CN 108985248 A 12/2018
(Continued)

*Primary Examiner* — Jessica M Merlin

(57) ABSTRACT

A display panel and a display device are provided. The display panel includes an array substrate, a color filter substrate, and a liquid crystal layer disposed between the array substrate and the color filter substrate. The array substrate includes at least one transparent support column for supporting the array substrate and the color filter substrate to form the liquid crystal layer, and at least one fingerprint sensor disposed at a position corresponding to the transparent support column. The display device includes the display panel.

9 Claims, 3 Drawing Sheets

(56) References Cited

U.S. PATENT DOCUMENTS

| | | | |
|---|---|---|---|
| 2017/0153512 A1* | 6/2017 | Chang | G02F 1/134309 |
| 2017/0192279 A1* | 7/2017 | Maede | G02F 1/136286 |
| 2018/0165498 A1 | 6/2018 | Xie et al. | |
| 2018/0211085 A1* | 7/2018 | Liu | G06K 9/0004 |
| 2019/0245011 A1* | 8/2019 | Lius | H01L 51/525 |

FOREIGN PATENT DOCUMENTS

| | | |
|---|---|---|
| CN | 109034089 A | 12/2018 |
| CN | 208488755 U | 2/2019 |

\* cited by examiner

DISPLAY PANEL AND DISPLAY DEVICE

FIELD OF INVENTION

This disclosure relates to display technology, and more particularly, to a display panel and a display device.

BACKGROUND OF INVENTION

In conventional display devices, such as smart phones, fingerprint recognition sensors are usually disposed at a menu button (home button) position. With the development of full screen technology, a border around a display is getting narrower and the menu button is omitted. The fingerprint recognition sensor disposed on a back surface or a side of a mobile phone becomes an intermediate transition solution. It is a trend to dispose the fingerprint recognition sensor under a display screen or inside the display screen in fingerprint recognition technology.

With the development of smart phones and tablets, fingerprint recognition technology has become a major selling point for mobile phone terminals. Optical fingerprint recognition technology is also in the demand of major mobile phone terminals.

At present, optical fingerprint recognition is equipped with an organic light emitting diode (OLED) screen, a fingerprint sensor is disposed under the OLED screen, and the fingerprint sensor senses images through a collimator.

A cross-sectional diagram of a conventional liquid crystal display panel is as shown in FIG. 1. The liquid crystal display panel 9 includes a lower polarizer 91, an array substrate 92, a liquid crystal layer 93, a color filter substrate 94, and an upper polarizer 95 laminated in an order from bottom to top. A collimator 96 is disposed in the liquid crystal layer 93, and a fingerprint sensor 97 corresponding to the collimator 96 is disposed on a side of the array substrate 92 adjacent to the liquid crystal layer 93.

Referring to FIG. 2, a pixel unit is formed in the liquid crystal display panel 9 by an RGBS method. R is a red sub-pixel, G is a green sub-pixel, B is a blue sub-pixel, S is a white sub-pixel, and black matrix 98 is disposed in a gap between the RGBS sub-pixels. A support column 99 is disposed at a boundary between a blue sub-pixel of a pixel unit and a red sub-pixel of an adjacent pixel unit, and the support column 99 is opaque, and used for supporting the array substrate 92 and the color filter substrate 94 to form the liquid crystal layer 93. The collimator 96 is disposed below the white sub-pixel S, and the fingerprint sensor 97 is disposed below the collimator 96 correspondingly. Since an aperture ratio of the white sub-pixel S is low, the external light (indicated by an arrow in FIG. 1) passes through the white sub-pixel S and is collimated by the collimator 96 to enter the fingerprint sensor 97. Therefore, a loss of the aperture ratio of the liquid crystal display panel 9 is at least of 30%. Moreover, such a structure cannot eliminate stray light and large-angle interference light, which are not through an optical path of the collimator and enter the fingerprint sensor 97. Therefore, the interference of the stray light and the large-angle interference light are serious, and there is a risk that the required light cannot be collected normally.

Therefore, it is necessary to provide a novel display panel and display device to solve the above technical problems.

SUMMARY OF INVENTION

An object of the disclosure is to provide a display panel and a display device that an amount of light entering the fingerprint sensor is increased and an aperture ratio of the display panel and the display device is improved. Moreover, the interference of stray light and large-angle interference light is eliminated, and the accuracy of fingerprint recognition is improved.

In order to achieve the above object, the disclosure provides a display panel. The display panel comprises an array substrate, a color filter substrate, and a liquid crystal layer disposed between the array substrate and the color filter substrate. The array substrate comprises at least one transparent support column for supporting the array substrate and the color filter substrate to form the liquid crystal layer, and at least one fingerprint sensor disposed at a position corresponding to the transparent support column.

Furthermore, a light absorbing layer is disposed on an outer surface of the transparent support column.

Furthermore, a material of the transparent support column comprises a photoresist material, and the photoresist material comprises a resin high polymer.

Furthermore, a height of the transparent support column ranges from 2 um to 4 um.

Furthermore, the color filter substrate further comprises a plurality of pixel units, and the transparent support column is disposed at a gap of two adjacent pixel units.

Furthermore, the color filter substrate further comprises a black matrix, the black matrix is disposed at a gap between two adjacent pixel units; and wherein a light transmission hole is disposed at a position of the black matrix corresponding to the transparent support column.

Furthermore, each of the pixel units comprises three sub-pixels arranged side by side, each of the sub-pixels respectively comprises a red sub-pixel, a green sub-pixel, and a blue sub-pixel, and the transparent support column is disposed at a boundary between the red sub-pixel of one sub-pixel and the blue sub-pixel of another horizontally adjacent sub-pixel.

Furthermore, each of the pixel units comprises four sub-pixels arranged side by side, each of the sub-pixels respectively comprises a red sub-pixel, a green sub-pixel, a blue sub-pixel, and a white sub-pixel, and the transparent support column is disposed between the white sub-pixels of the two vertically adjacent sub-pixels.

Furthermore, the display panel further comprises a lower polarizer disposed on a side of the array substrate facing away from the liquid crystal layer, and an upper polarizer disposed on a side of the color filter substrate facing away from the liquid crystal layer.

The disclosure further provides a display device comprising the display panel mentioned above.

The technical effects are as follows. The disclosure provides a display panel and a display device. A support column is provided as a transparent material to form the transparent support column to function as a collimator, so that the light entering the fingerprint sensor is increased, and the aperture ratio of the display panel and the display device is improved. Moreover, the interference of stray light and large-angle interference light is eliminated, and the accuracy of fingerprint recognition is improved. It is beneficial to integrate a display function, a touch function and a fingerprint recognition function into the display panel and the display device.

Figure 1:
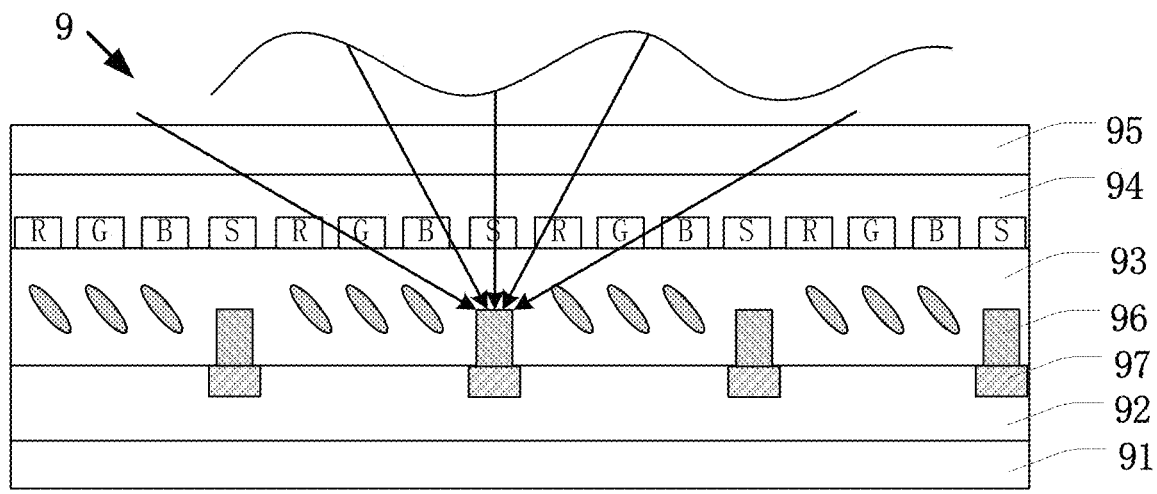
FIG. 1 is a cross-sectional diagram of a conventional liquid crystal display panel.
Figure 2:
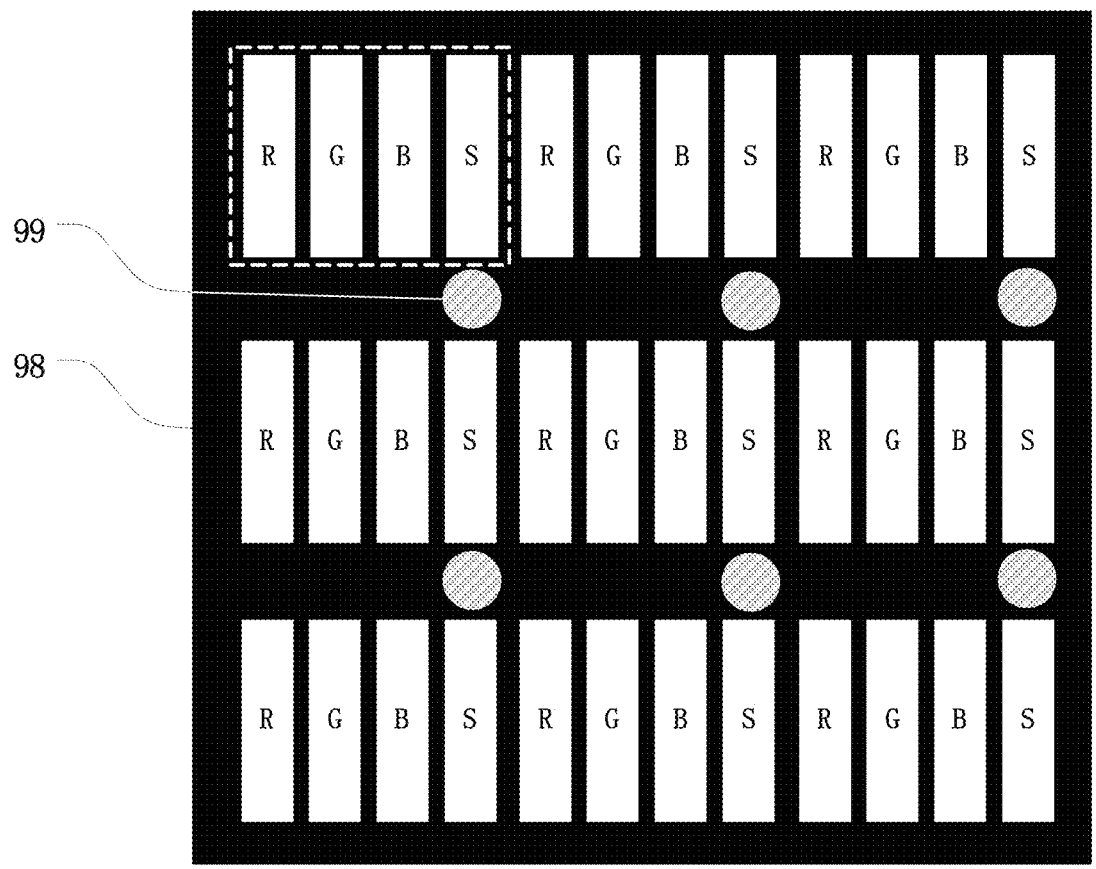
FIG. 2 is a planar schematic diagram of the liquid crystal display panel of FIG. 1.

1—array substrate; 2—color filter substrate; 3—liquid crystal layer; 4—lower polarizer; 5—upper polarizer; 11—transparent support column; 12—fingerprint sensor; 21—pixel unit; 22—black matrix; 23—light transmission hole; 100—display panel; 111—light absorbing layer; 210a, 210b—sub-pixel; 211a, 211b—red sub-pixels; 212a, 212b—green sub-pixels; 213a, 213b—blue sub-pixel; 214b—white sub-pixel

DETAILED DESCRIPTION OF PREFERRED EMBODIMENTS

This description of the exemplary embodiments is intended to be read in connection with the accompanying drawings, which are to be considered part of the entire written description. In the description, terms such as "lower", "upper", "front", "behind", "left", "right", "inside", "outside", and "side", as well as derivatives thereof, should be construed to refer to the orientation as then described or as shown in the drawing under discussion. The elements mentioned in the disclosure, such as the first, second, etc., are only to better distinguish and express different components. Referring to the drawings of the disclosure, similar elements are labeled with the same number.

In the description of this disclosure, it should be noted that the terms "dispose", "arrange", "connected", and "connection" are to be understood broadly, unless otherwise specified and defined. For example, it can be a fixed connection, a detachable connection, or an integrated connection. It also can be a mechanical connection or an electrical connection. It further can be directly connected, or indirectly connected through an intermediate medium. It still can be an internal connection between the two elements. The specific meaning of the above terms in the disclosure can be understood in specific circumstances by those skilled in the art.

Figure 3:
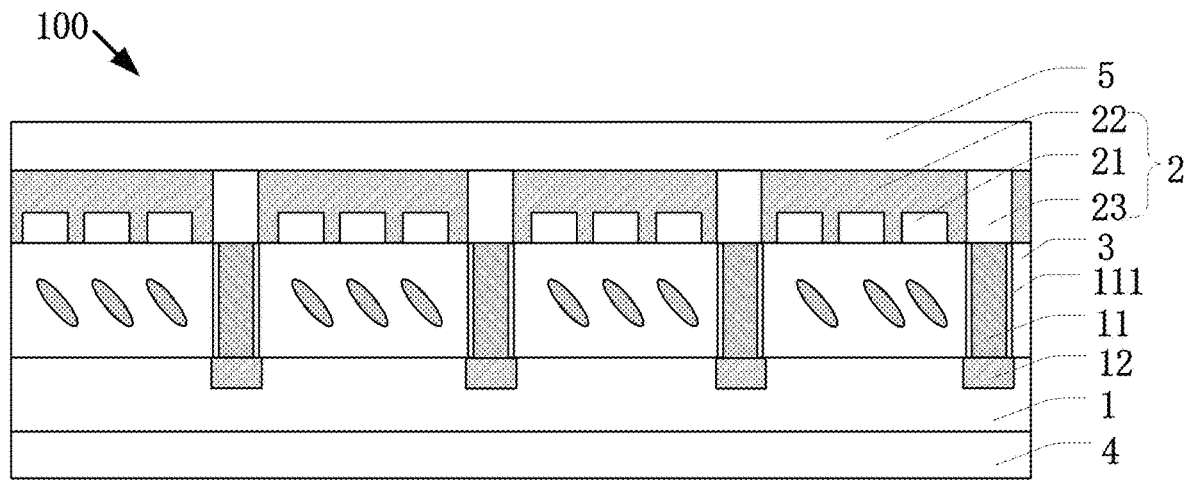
FIG. 3 is a cross-sectional diagram of a display panel according to an embodiment of the disclosure.

Referring to FIG. 3, the disclosure provides a display panel 100. The display panel 100 comprises an array substrate 1, a color filter substrate 2, and a liquid crystal layer 3 disposed between the array substrate 1 and the color filter substrate 2. The array substrate 1 comprises at least one transparent support column 11 for supporting the array substrate 1 and the color filter substrate 2 to form the liquid crystal layer 3, and at least one fingerprint sensor 12 disposed at a position corresponding to the transparent support column 11. The transparent support column functions as a collimator, so that the light entering the fingerprint sensor is increased, and the aperture ratio of the display panel and the display device is improved.

Referring to FIG. 3, in this embodiment, the display panel 100 further includes a lower polarizer 4 and an upper polarizer 5 disposed opposite to each other. Specifically, the lower polarizer 4 is disposed on a side of the array substrate 1 facing away from the liquid crystal layer 3, and the upper polarizer 5 is disposed on a side of the color filter substrate 2 facing away from the liquid crystal layer 3.

In this embodiment, a light absorbing layer 111 is disposed on an outer surface of the transparent support column 11. The light absorbing layer 111 can absorb stray light and large-angle interference light. The light originally distributed in a large angular range is emitted into the fingerprint sensor 12 in a small angular range, thereby preventing the interference of stray light and large-angle interference light, which are not through an optical path of the collimator and reducing the interference between adjacent pixel units. Therefore, the accuracy of the fingerprint recognition is improved.

In this embodiment, a material of the transparent support column 11 includes a photoresist material, and the photoresist material comprises a resin high polymer. The transparent support column 11 made of a transparent material functions as a collimator, so that the amount of the light entering the fingerprint sensor 12 is increased, and the aperture ratio of the display panel 100 is improved.

In this embodiment, a height of the transparent support column 11 ranges from 2 um to 4 um. Since the transparent support column 11 comprises the height of 2 um to 4 um, the light corresponding to an area where the transparent support column 11 is disposed can be selected, thereby preventing the interference of stray light and large-angle interference light in an optical path of the non-collimator. Therefore, the accuracy of the fingerprint recognition is improved.

In this embodiment, the color filter substrate 2 includes a plurality of pixel units 21, and the transparent support column 11 is disposed at a gap of two adjacent pixel units to achieve the slimness of the display panel 100.

In this embodiment, the color filter substrate 2 further includes a black matrix 22 disposed at a gap between two adjacent pixel units 21. The pixel unit 21 is disposed within a grid of the black matrix 22 and penetrates the black matrix 22. That is to say, the pixel unit 21 and the black matrix 22 are disposed in same layer. A light transmission hole 23 is disposed at a position of the black matrix 22 corresponding to the transparent support column 11. That is, the light at the position of the black matrix 22 corresponding to the transparent support column 11 is not blocked. A transparent processing is performed at a position corresponding to the transparent support column 11, so that the light entering the fingerprint sensor 12 is increased, and the aperture ratio of the display panel 100 is increased.

Figure 4:
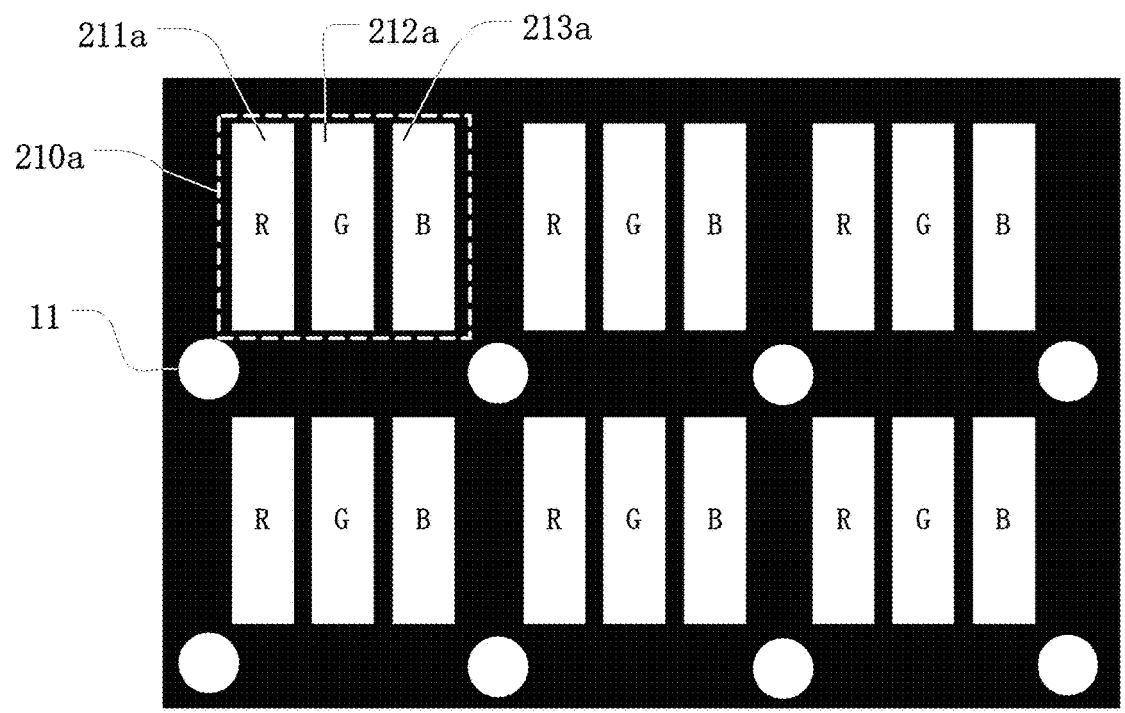
FIG. 4 is a planar schematic diagram of the display panel according to an embodiment of the disclosure.

Referring to FIG. 4, in this embodiment, each of the pixel units 21 comprises three sub-pixels 210a arranged side by side, each of the sub-pixels respectively comprises a red sub-pixel 211a, a green sub-pixel 212a, and a blue sub-pixel 213a. The transparent support column 11 is disposed at a boundary between the red sub-pixel 211a of one sub-pixel and the blue sub-pixel 213a of another horizontally adjacent sub-pixel 210a.

Figure 5:
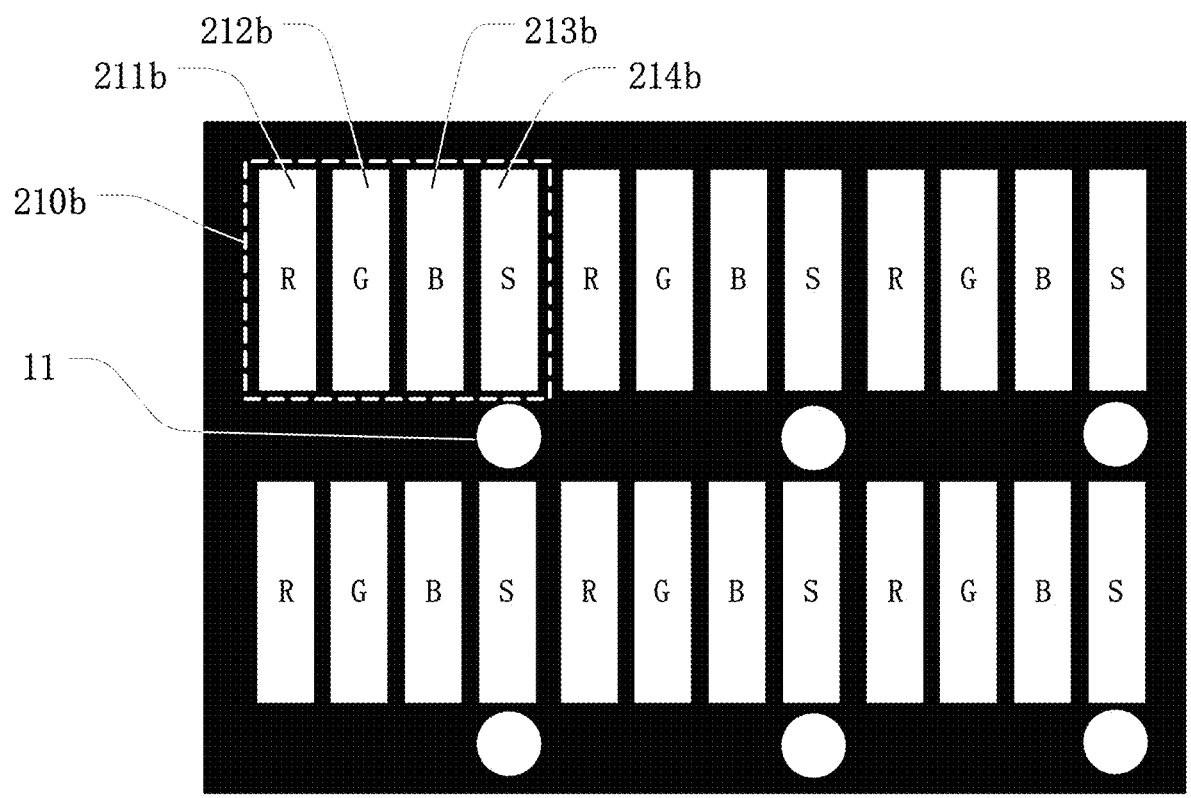
FIG. 5 is a schematic diagram of a planar structure of another display panel according to an embodiment of the disclosure.

Referring to FIG. 5, in other embodiments, each pixel unit 21 includes four sub-pixels 210b arranged side by side, each of the sub-pixels respectively comprises a red sub-pixel 211b, a green sub-pixel 212b, a blue sub-pixel 213b, and a white sub-pixel 214b. The transparent support pillar 11 is disposed between the white sub-pixels 214b of the two vertically adjacent sub-pixels.

In use, when a finger touches the display panel 100, the light emitted by the display panel 100 reaches the finger and is reflected to form reflected light, and the reflected light passes through the display panel 100 and is collimated by the transparent support column 11 functioned as a collimator. Then, the reflected light enters into the fingerprint sensor 12. Due to the variation of an intensity of light reflected by the finger ridges and finger valleys, the intensity of light received by the fingerprint sensor 12 varies, thereby being converted into different electrical signals. Finally, the fingerprint recognition is achieved. Since the transparent support column 11 comprises the height of 2 um to 4 um, the light corresponding to an area where the transparent support column 11 is disposed can be selected, thereby preventing the interference of stray light and large-angle interference light, which are not through the optical path of the collimator. Therefore, the accuracy of the fingerprint recognition is improved. In this embodiment, a light absorbing layer 111 is disposed on an outer surface of the transparent support column 11. The light absorbing layer 111 can absorb stray light and large-angle interference light. The light originally distributed in a large angular range is emitted into the fingerprint sensor 12 in a small angular range, thereby preventing the interference of stray light and large-angle interference light, which are not through the optical path of the non-collimator and reducing the interference between adjacent pixel units. Therefore, the accuracy of the fingerprint recognition is improved.

The disclosure further provides a display device comprising the display panel 100 described above.

The display device in the embodiment of the disclosure may be any product or component having a display function, such as a mobile phone, a tablet, a television, a display, a notebook, a digital photo frame, a navigator, and the like.

The technical effects are as follows. The disclosure provides a display panel and a display device. A support column is provided as a transparent material to form the transparent support column to function as a collimator, so that the light entering the fingerprint sensor is increased, and the aperture ratio of the display panel and the display device is improved. Moreover, the interference of stray light and large-angle interference light is eliminated, and the accuracy of fingerprint recognition is improved. It is beneficial to integrate a display function, a touch function and a fingerprint recognition function into the display panel and the display device.

This disclosure has been described with preferred embodiments thereof, and it is understood that many changes and modifications to the described embodiment can be carried out without departing from the scope and the spirit of the invention.

What is claimed is:

1. A display panel, comprising:
   an array substrate;
   a color filter substrate disposed opposite to the array substrate;
   a liquid crystal layer disposed between the array substrate and the color filter substrate;
   wherein the array substrate comprises:
   at least one transparent support column for supporting the array substrate and the color filter substrate to form the liquid crystal layer, wherein a light absorbing layer is disposed on an outer lateral surface of the transparent support column, and completely covers the outer lateral surface of the transparent support column; and
   at least one fingerprint sensor disposed at a position corresponding to the transparent support column.

2. The display panel according to claim 1, wherein a material of the transparent support column comprises a photoresist material, and the photoresist material comprises a resin high polymer.

3. The display panel according to claim 1, wherein a height of the transparent support column ranges from 2 um to 4 um.

4. The display panel according to claim 1, wherein the color filter substrate further comprises a plurality of pixel units, and the transparent support column is disposed at a gap of two adjacent pixel units.

5. The display panel according to claim 4, wherein the color filter substrate further comprises a black matrix, the black matrix is disposed at a gap between two adjacent pixel units; and wherein a light transmission hole is disposed at a position of the black matrix corresponding to the transparent support column.

6. The display panel according to claim 4, wherein each of the pixel units comprises three sub-pixels arranged side by side, each of the sub-pixels respectively comprises a red sub-pixel, a green sub-pixel, and a blue sub-pixel; and
   wherein the transparent support column is disposed at a boundary between the red sub-pixel of one sub-pixel and the blue sub-pixel of another horizontally adjacent sub-pixel.

7. The display panel according to claim 4, wherein each of the pixel units comprises four sub-pixels arranged side by side, each of the sub-pixels respectively comprises a red sub-pixel, a green sub-pixel, a blue sub-pixel, and a white sub-pixel; and
   wherein the transparent support column is disposed between the white sub-pixels of the two vertically adjacent sub-pixels.

8. The display panel according to claim 1, wherein the display panel further comprises:
   a lower polarizer disposed on a side of the array substrate facing away from the liquid crystal layer; and
   an upper polarizer disposed on a side of the color filter substrate facing away from the liquid crystal layer.

9. A display device, comprising a display panel according to claim 1.

* * * * *